Nov. 4, 1952        H. VAN DOORNE        2,616,181
DRAFTING AND MEASURING RULER
Filed April 7, 1949
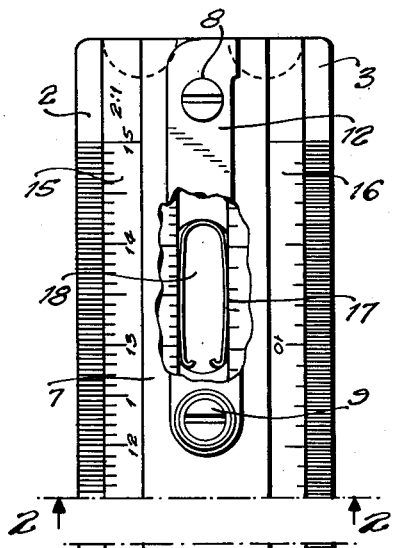
FIG. 1.
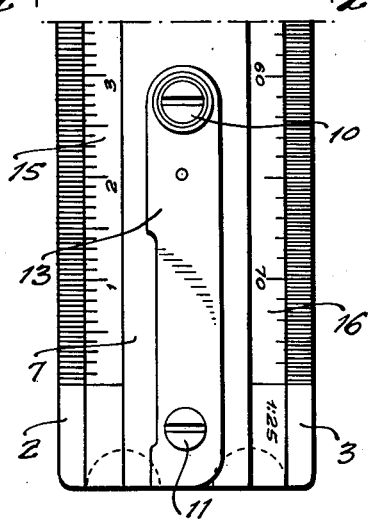
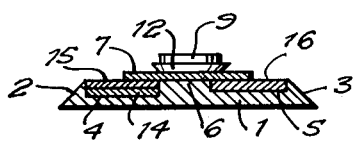
FIG. 2.
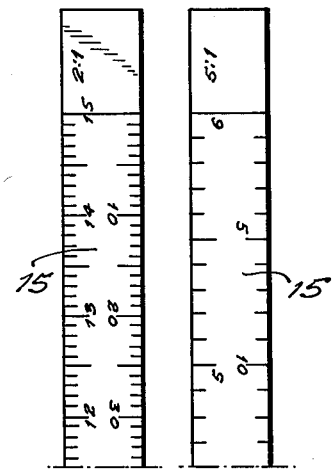
FIG. 3.
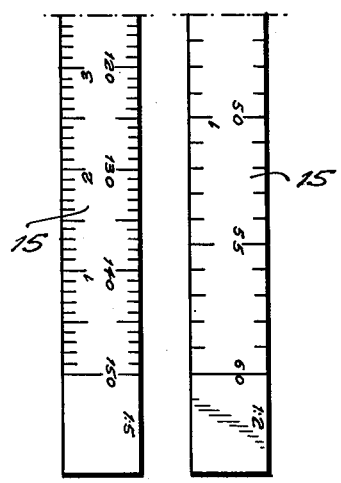
*INVENTOR.*
HENDRIK VAN DOORNE
BY Patented Nov. 4, 1952

2,616,181

UNITED STATES PATENT OFFICE 2,616,181

DRAFTING AND MEASURING RULER

Hendrik van Doorne, Amsterdam, Netherlands

Application April 7, 1949, Serial No. 86,013
In the Netherlands April 19, 1948

12 Claims. (Cl. 33—107)

The invention relates to a drafting and measuring ruler with bevelled drawing edges which are each subdivided in a standard measure, more particularly in distances of 1 mm. respectively 0.8 mm., and with interchangeable scale strips. Such measuring and drafting devices are already known, in which two scale strips are present, of which always only one can be fixed on the ruler with the aid of a fixing screw projecting at the top of the ruler and a loose nut. The top side of the ruler further carries two fixed scales, which can be covered by the scale strips. The ruler itself has therefore a trapezium form in cross section and the interchangeable scale strips lie on the narrow top side, which causes inevitably that when using the scale strips parallax phenomena arise. Also the fact, that the scale strips carry scales for both drawing edges, thus also for both standard subdivisions, can cause errors. Furthermore by its construction, this ruler is not suitable for use on a drawing machine for which up till now only interchangeable rulers with two scales were available. As for drawing to scale with a drawing machine always two rulers with the desired scales must be fixed on the machine, while in the several branches of the technics about twenty different scales are used (the standard gauge N. 13 gives 19 scales); it will be evident, that a rather good equipped drawing room must have a very large number of loose rulers or scale rulers at its disposal for the drawing machines. This at the same time carries with it a rather considerable capital investment, as the drawing edges, which are necessarily all separately subdivided into the finest standard units, make these rulers rather expensive.

The invention now aims at providing a drafting and measuring ruler in which the described disadvantages are met and which at the same time can be used very well on drawing machines.

According to the invention this is obtained by that one or more separate scale strips are present for each standard subdivision, which scale strips lie separated by a dam in rectangular slots parallel to the base of the ruler, immediately behind the subdivided drawing edges and are held by a covering strip connected with the dam, which covering strip covers the scale strips lying on both sides of the dam at least for one half. In this way a flat and very surveyable ruler construction is obtained, which can be easily made to carry itself all the necessary scale strips in an interchangeable manner, so that no loose parts are present while parallax phenomena can be absolutely avoided by the immediate abutment between the drawing edges and the scale strips, so that the whole construction is also appropriate for use on drawing machines.

The covering strip can, for ordinary rulers, be connected detachably, for instance with a screw which at the same time can serve as a grip. Preferably however, also in connection with the aimed use on drawing machines, it is fixedly connected to the dam standing between the two slots for the scale strips and the dam and the covering strip are made in such a manner that they can be provided with chuck plates for connection to a drawing machine.

For preventing undesired displacements to the scale strips in the slots and yet enabling an exact adjustment between each scale strip and the drawing edge belonging to it, and at the same time for keeping the scale strip pressed against the drawing edge, the dam can appropriately be provided at one or more places with an interruption or a lateral recess, in which spring elements are arranged, which press the scale strip or scale strips to the drawing edges belonging to it.

The invention will now be described with reference to a drawing machine ruler according to the invention, shown in the drawing by way of example. In the drawing:

Fig. 1 shows a top elevation of a ruler with chuck plates.

Fig. 2 a cross section according to the line II—II to Fig. 1 and

Fig. 3 shows the two sides of one of the scale strips belonging to the millimeter subdivision.

In the drawing 1 is the ruler with bevelled drawing edges 2 and 3, which, in the shown embodiment for the metric system, are provided on the whole breadth in distances of 1 mm. respectively 0.8 mm. with engraved or imprinted lines. Immediately behind these drawing edges slots 4 and 5 are provided in the ruler, which slots are mutually separated by a dam 6, on which a covering strip 7 is fixed, for instance by gluing and/or with the aid of the screws 8, 9, 10 and 11, with which the chuck plates 12 and 13 are fixed at both ends of the ruler. In the slots 4 and 5 lie respectively two scale strips 14 and 15 with each four scales belonging to the drawing edge 2 which is subdivided in distances of 1 mm. and one scale strip 16 with four scales belonging to the drawing edge which is subdivided in distances of 0.8 mm. The scale strips 14, 15 and 16 are of the same breadth but the scale strips 14 and 15 are thinner than the scale strip 16, however in such a manner, that the total thickness of the strips 14 and 15 is greater than the thickness of the strip 16. Hereby already uninterchangeableness of the scale strips is obtained with respect to the slots 4 and 5. However it is also possible to accomplish this uninterchangeableness by making the strip 16 and the slot 5 belonging to it narrower than the other, or by combining these two measures. The slots 4 and 5 are further made with such a depth, that the scale strip 16 and the upper scale strip 15 lie flush with the upper rim of the drawing edges belonging to them and no parallax is possible. The cover strip 7 keeps the scale strips enclosed in the slots and covers them at least about for one half, so that at each side of the ruler only one scale of the scale strips with the drawing edge belonging to it is visible with the indications and numbers belonging to it and reading errors are precluded. The scale strips can be slided out for making visible of another scale and against undesired displacements they are pressed outwards, that is to say against the drawing edges, in the slots by spring 17, which are arranged in recesses 18 in the dam under the covering strip 7.

In Fig. 3 the front and backs sides of the scale strip 15 are shown by way of example.

A ruler according to the invention is especially of great interest for drawing machines, but besides it can also be very handy and useful as a measuring ruler. For drawing machines the ruler has the advantage that it can be made fully or practically equal to the usual rulers, as well with respect to its dimensions, such as breadth and height, as with respect to its form, and that it is considerably cheaper and easier in use than the existing scale rulers for drawing machines, as the subdivisions of the drawing edges are to be manufactured only once for each ruler and each set of rulers is only once to be adjusted by the square on the drawing machine, after which this adjustment remains the same for all scales.

The invention is above elucidated with reference to an example of performance but it is not restricted to rulers for the metric system and can also be constructed for other measure systems, such as the English system. In such a case the number of each strip can be altered. The ruler can also be constructed as a measuring ruler or hand ruler with one or more grips.

Having now particularly described and ascertained the nature of my said invention and in what manner the same is to be performed, I declare that what I claim is:

1. A drawing and measuring ruler including an elongated generally flat member of rectangular cross-section having inclined opposite drawing edges with indicated divisions applied thereto such as 1 mm. and 0.8 mm., respectively; an upwardly projecting central elongated portion serving to support a covering strip, the ruler having a pair of upwardly open grooves at the sides of said upwardly projecting portion; a pair of scale strips occupying one groove with the upper scale strip substantially flush with the upwardly projecting central portion and the upper portion of the outer inclined drawing edge bounding the outer side of the groove involved; a further scale strip in the other groove which is flush with said upwardly projecting central portion of the ruler and the upper inner portion of the other inclined drawing edge; an elongated covering strip overlying said upwardly projecting central portion and the adjacent portions of said scale strips in such manner as to expose the outer portion of the upper surfaces thereof to view, said scale strips having indicia upon the surfaces at the outer edges thereof; and means for securing said covering strip in position above said scale strips upon said ruler.

2. A drawing and measuring ruler including a generally flat elongated member of rectangular cross-section having inclined opposite drawing edges with indicated divisions applied thereto such as 1 mm. and 0.8 mm., respectively; an upwardly projecting central portion having a flat top, the ruler having a pair of upwardly open grooves of substantially rectangular cross-section at both sides of said upwardly projecting central portion; at least one elongated flat scale strip occupying one groove with the upper surface thereof substantially flush with the upwardly projecting central portion of the ruler and the upper portion of the outer inclined drawing edge bounding the outer side of the groove involved; another elongated flat scale strip occupying the other groove with the upper surface thereof substantially flush with said upwardly projecting portion and the upper inner portion of the other inclined drawing edge; a substantially flat elongated covering strip overlying the flat top of said upwardly projecting central portion and substantially one half of the adjacent upper surface portions of the scale strips in such manner as to expose the outer portions of said upper surfaces to view, said scale strips having indicia upon the upper surfaces thereof adjacent to the outer edges for cooperation with the indicia upon the inclined drawing edges of said ruler; and means for releasably securing said covering strip in position upon said scale strips and upwardly projecting central portion upon said ruler.

3. In a drawing and measuring ruler of generally rectangular cross-section with inclined outer drawing edges having subdivisions of predetermined measurements applied thereto, said ruler having a pair of substantially rectangular and upwardly open grooves extending longitudinally therein; an upwardly extending central projection forming a separating wall between said grooves with the upper surface disposed at substantially the same level as the upper inner portions of said outer inclined drawing edges; a pair of substantially rectangular elongated scale strips occupying said grooves with the upper surfaces thereof substantially flush with the central projection and the upper inner portions of said inclined drawing edges and having indicia applied to the outer portions of said upper surfaces adjacent to said inclined drawing edges; strip means overlying said central projecting and portions of said scale strips adjacent thereto; and means for releasably attaching said strip means to said central projection in order to retain said scale strips in position in said grooves.

4. A drawing and measuring ruler including an elongated, generally flat member of substantially rectangular cross section having inclined opposite drawing edges with different predetermined indicated divisions applied thereto; an upwardly projecting elongated intermediate dam portion rigidly disposed on the flat member, the latter having a pair of upwardly open grooves at the sides of said dam portion; at least one scale strip occupying each groove and the upper exposed surfaces of the scale strips in both grooves being disposed substantially at the level of the upper end or limit of said dam portion and of the upper portions of the outer inclined drawing edges bounding the outer sides of said grooves, the scale strips being interchangeable with others and having two or more rows of predetermined indicia applied upon the edges of each; and an elongated covering strip stationarily mounted upon said dam portion and overlying the adjacent portions of the upper surfaces of said scale strips in such manner as to expose the outer mutually remote upper portions to view, while sufficient portions of said dam portion and covering strip are accessible upon said ruler to receive chuck plates and the like for connecting the ruler to a drawing machine.

5. In a drawing and measuring ruler of generally rectangular cross-section with inclined outer drawing edges having subdivisions of predetermined measurements applied thereto, said ruler having a pair of substantially rectangular and upwardly open grooves extending longitudinally therein; an upwardly extending central dam portion forming a separating wall between said grooves with the upper end thereof disposed at substantially the same level as the upper inner portions of said outer inclined drawing edges; at least one substantially rectangular elongated scale strip occupying each of said grooves with the upper exposed surfaces thereof disposed substantially at the same level as the upper inner portions of said inclined drawing edges and the upper end of said dam portion, the latter having at least one gap opening at the opposite sides thereof to both grooves; resilient means located in the gap in said dam portion and biasing the scale strips in both grooves outward in opposite directions toward said inclined drawing edges; and an elongated covering strip secured upon said dam portion and overlying the gap therein and the adjacent portions of the upper surfaces of said scale strips in such manner as to expose the outer mutually remote upper portions to view, while sufficient portions of said dam portion and covering strip are accessible upon said ruler to receive chuck plates and the like for connecting the ruler to a drawing machine.

6. In a drawing and measuring ruler of generally rectangular cross-section with inclined outer drawing edges having subdivisions of predetermined measurements applied thereto, said ruler having a pair of substantially rectangular and upwardly open grooves extending longitudinally therein; an upwardly extending central dam portion forming a separating wall between said grooves with the upper end thereof disposed at substantially the same level as the upper inner portions of said outer inclined drawing edges; at least one substantially rectangular elongated scale strip occupying each of said grooves with the upper exposed surface thereof disposed substantially at the same level as the upper inner portions of said inclined drawing edges and the upper end of said dam portion, the latter having a pair of gaps longitudinally spaced apart therein and opening at both sides thereof into both grooves; and a pair of looped springs individually disposed in the gaps and bearing against the scale strips in both grooves in such fashion as to bias said scale strips outward in opposite directions toward said inclined drawing edges; and an elongated covering strip securing upon said dam portion and overlying the gaps therein and the adjacent portions of the upper surfaces of said scale strips in such manner as to expose the outer mutually remote upper portions to view, while sufficient portions of said dam portion and covering strip are accessible upon said ruler to receive chuck plates and the like for connecting the ruler to a drawing machine.

7. A ruler, comprising in combination, a substantially rectangular body portion having opposite inclined edges provided with graduations thereon, said body portion being formed with a pair of spaced rectangular channels extending in a direction parallel to said opposite edges of said body portion and being located next to said opposite edges, said body portion being provided between said channels with a flat upper surface; at least one scale located in each of said channels and having an upper surface flush with said flat upper surface of said body portion; and a flat, rigid cover strip mounted on said body portion and abutting against said upper surface of said body portion, said cover strip being located in overlapping relation with said scales, whereby a chuck plate means may be mounted on said cover strip so that the ruler may be connected to a drawing machine.

8. A ruler, comprising in combination, a substantially rectangular body portion having opposite inclined edges provided with graduations thereon, said body portion being formed with a pair of spaced rectangular channels extending in a direction parallel to said opposite edges of said body portion and being located next to said opposite edges, said body portion being provided between said channels with a flat upper surface; at least one scale located in each of said channels and having an upper surface flush with said flat upper surface of said body portion; a flat, rigid cover strip mounted on said body portion and abutting against said upper surface of said body portion, said cover strip being located in overlapping relation with said scales, whereby a chuck plate means may be mounted on said cover strip so that the ruler may be connected to a drawing machine; and screw means extending through said cover strip and flat upper surface of said body portion and into the latter for connecting said cover strip to said body portion.

9. A ruler, comprising in combination, a substantially rectangular body portion having opposite inclined edges provided with graduations thereon, said body portion being formed with a pair of spaced rectangular channels extending in a direction parallel to said opposite edges of said body portion and being located next to said opposite edges, said body portion being provided between said channels with a flat upper surface; at least one scale located in each of said channels and having an upper surface flush with said flat upper surface of said body portion; and a flat, rigid cover strip mounted on said body portion and abutting against said upper surface of said body portion, said cover strip being located in overlapping relation with said scales and covering approximately one half of the width of each of said scales, whereby a chuck plate means may be mounted on said cover strip so that the ruler may be connected to a drawing machine.

10. A ruler, comprising in combination, a substantially rectangular body portion having opposite inclined edges provided with graduations thereon, said body portion being formed with a pair of spaced rectangular channels extending in a direction parallel to said opposite edges and being respectively located next to the same and said body portion being provided between said channels with a flat upper surface, one of said channels being deeper than the other; a pair of scales located in overlying relation with respect to each other in said one of said channels and the outermost one of said scales having an outer surface which is flush with said upper surface of said body portion; at least one scale mounted in the other of said channels and also having an outer surface flush with said flat upper surface of said body portion; and a rigid flat cover strip mounted on said flat upper surface of said body portion and partially overlapping said scale in said other channel and said outer scale in said one channel.

11. A ruler, comprising in combination, a substantially rectangular body portion having opposite inclined edges provided with graduations thereon, said body portion being formed with a pair of spaced rectangular channels extending in a direction parallel to said opposite edges and being respectively located next to the same and said body portion being provided between said channels with a flat upper surface, one of said channels being deeper than the other; a pair of scales located in overlying relation with respect to each other in said one of said channels and the outermost one of said scales having an outer surface which is flush with said upper surface of said body portion; at least one scale mounted in the other of said channels and also having an outer surface flush with said flat upper surface of said body portion; a rigid flat cover strip mounted on said flat upper surface of said body portion and partially overlapping said scale in said other channel and said outer scale in said one channel; and at least one chuck plate mounted on said cover strip so that the ruler may be thereby attached to a drafting machine.

12. A ruler, comprising in combination, a substantially rectangular body portion having opposite inclined edges provided with graduations thereon, said body portion being formed with a pair of spaced rectangular channels extending in a direction parallel to said opposite edges and being respectively located next to the same and said body portion being provided between said channels with a flat upper surface, one of said channels being deeper than the other; a pair of scales located in overlying relation with respect to each other in said one of said channels and the outermost one of said scales having an outer surface which is flush with said upper surface of said body portion; at least one scale mounted in the other of said channels and also having an outer surface flush with said flat upper surface of said body portion; a rigid flat cover strip mounted on said flat upper surface of said body portion and partially overlapping said scale in said other channel and said outer scale in said one channel; at least one chuck plate mounted on said cover strip so that the ruler may be thereby attached to a drafting machine; and screw means extending through said chuck plate, cover strip, and flat upper surface of said body portion and into the latter for fixedly connecting said chuck plate and cover strip to said body portion.

HENDRIK van DOORNE.

REFERENCES CITED

The following references are of record in the file of this patent:

UNITED STATES PATENTS

| Number | Name | Date |
|---|---|---|
| 1,810,392 | Clark | June 16, 1931 |

FOREIGN PATENTS

| Number | Country | Date |
|---|---|---|
| 274,427 | Germany | May 20, 1914 |
| 430,934 | Great Britain | June 27, 1935 |